(12) United States Patent
Littmann et al.

(10) Patent No.: US 9,931,608 B2
(45) Date of Patent: *Apr. 3, 2018

(54) PROCESS FOR SEPARATING COMPONENTS OF A POLYMER-MONOMER MIXTURE OBTAINED BY HIGH-PRESSURE POLYMERIZATION OF ETHYLENICALLY UNSATURATED MONOMERS

(71) Applicant: Basell Polyolefine GmbH, Wesseling (DE)

(72) Inventors: Dieter Littmann, Mücke (DE); Georg Groos, Dannstadt-Schauernheim (DE); Andre-Armand Finette, Köln (DE); Michael Deuerling, Weilerswist (DE); Sven Wolfram, Euskirchen (DE); Juergen Mohrbutter, Alfter (DE); Danir Khayrullin, Brühl (DE); Claudio Fibla, Königstein im Taunus (DE); Christoph Wolf, Pulheim-Dansweiler (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/523,909

(22) PCT Filed: Nov. 12, 2015

(86) PCT No.: PCT/EP2015/076433
§ 371 (c)(1),
(2) Date: May 2, 2017

(87) PCT Pub. No.: WO2016/075235
PCT Pub. Date: May 19, 2016

(65) Prior Publication Data
US 2017/0348658 A1    Dec. 7, 2017

(30) Foreign Application Priority Data
Nov. 13, 2014    (EP) .................................... 14192974

(51) Int. Cl.
*C08G 63/02*    (2006.01)
*B01J 4/00*    (2006.01)
*C08F 2/01*    (2006.01)
*C08F 2/00*    (2006.01)

(52) U.S. Cl.
CPC ............... *B01J 4/002* (2013.01); *C08F 2/004* (2013.01); *C08F 2/01* (2013.01); *B01J 2219/1943* (2013.01); *B01J 2219/1946* (2013.01)

(58) Field of Classification Search
CPC ...................................................... B01J 4/002
USPC ........................................................ 528/481
See application file for complete search history.

(56) References Cited

U.S. PATENT DOCUMENTS

| | | |
|---|---|---|
| 7,098,301 B1 | 8/2006 | Smith |
| 9,637,569 B2 * | 5/2017 | Neumann ................. C08F 6/10 |
| 2012/0240960 A1 | 9/2012 | Cornelissen et al. |

FOREIGN PATENT DOCUMENTS

WO    WO 2015/082565 A1    6/2015

OTHER PUBLICATIONS

PCT International Search Report & Written Opinion dated Mar. 7, 2016 for PCT/EP2015/076433.

* cited by examiner

*Primary Examiner* — Terressa Boykin

(57) ABSTRACT

A process for separating polymeric and gaseous components of a polymer-monomer mixture at a pressure of from 0.12 MPa to 0.6 MPa and a temperature of from 120° C. to 300° C. in a separation vessel is provided. The separation vessel has a vertically arranged cylindrical shape with a ratio of length to diameter L/D of from 0.6 to 10 and an inlet pipe capable of introducing the polymer-monomer mixture into the separation vessel which the inlet pipe extends vertically from the top of the separation vessel into the separation vessel. Further a process for preparing ethylene homopolymers or copolymers from ethylenically unsaturated monomers in the presence of free-radical polymerization initiators at temperatures from 100° C. to 350° C. and pressures in the range of from 110 MPa to 500 MPa comprising such a process for separating a polymer-monomer mixture is provided.

20 Claims, 2 Drawing Sheets

PROCESS FOR SEPARATING COMPONENTS OF A POLYMER-MONOMER MIXTURE OBTAINED BY HIGH-PRESSURE POLYMERIZATION OF ETHYLENICALLY UNSATURATED MONOMERS

This application is the U.S. National Phase of PCT International Application PCT/EP2015/076433, filed Nov. 12, 2015, claiming benefit of priority to European Patent Application No. 14192974.5, filed Nov. 13, 2014, the disclosures of which are incorporated herein by reference in their entirety.

FIELD OF THE INVENTION

The present disclosure provides a process for separating a mixture comprising polymeric components and gaseous components into a liquid fraction and a gaseous fraction, where the polymeric components of the mixture are obtained by high-pressure polymerization of ethylenically unsaturated monomers in the presence of at least one free-radical polymerization initiator. In some embodiments, the present disclosure provides a process for preparing ethylene homopolymers or copolymers from ethylenically unsaturated monomers in the presence of free-radical polymerization initiators.

BACKGROUND OF THE INVENTION

Polyethylene is the most widely used commercial polymer. It can be prepared by a couple of different processes. Polymerization in the presence of free-radical initiators at elevated pressures was the method first discovered to obtain polyethylene and continues to be a valued process with high commercial relevance for the preparation of low density polyethylene (LDPE).

A normal set-up of a plant for preparing low density polyethylene comprises, a polymerization reactor which can be an autoclave or a tubular reactor or a combination of such reactors and additional equipment. For pressurizing the reaction components, usually a set of two compressors, a primary and a secondary compressor, is used. At the end of the polymerization sequence, a high-pressure polymerization unit that may include apparatuses like extruders and granulators for pelletizing the resulting polymer can be used. Furthermore, such a polymerization unit generally also comprises means for feeding monomers and comonomers, free-radical initiators, modifiers or other substances at one or more positions to the polymerization reaction.

A characteristic of the radically initiated polymerization of ethylenically unsaturated monomers under high pressure is that the conversion of the monomers is generally not complete. For each pass of the reactor, only about 10% to 50% of the dosed monomers are converted in the case of polymerization in a tubular reactor, and from 8% to 30% of the dosed monomers are converted in the case of polymerization in an autoclave reactor. Accordingly, it is common practice to separate the discharged reaction mixture into polymeric and gaseous components and recycle the monomers. To avoid unnecessary decompression and compression steps, the separation into polymeric and gaseous components is usually carried out in two stages. The reaction mixture leaving the reactor is transferred to a first separating vessel, frequently called a high-pressure product separator, in which the separation in polymeric and gaseous components is carried out at a pressure that allows for recycling of the ethylene and comonomers separated from the reaction mixture to the reaction mixture at a position between the primary compressor and the secondary compressor. At the conditions for operating the first separation vessel, the polymeric components within the separating vessel are in a liquid state. The liquid phase obtained in the first separating vessel is transferred to a second separation vessel, frequently called a low-pressure product separator, in which a further separation into polymeric and gaseous components takes place at lower pressure. The ethylene and additional comonomers separated from the mixture in the second separation vessel are fed to the primary compressor, where they are compressed to the pressure of the fresh ethylene feed, combined with the fresh ethylene feed and the joined streams are further pressurized to the pressure of the high-pressure gas recycle stream. The level of the liquid phases in the first and the second separating vessels are generally measured by radiometric level measurement and are controlled automatically by product discharge valves.

Separating polymeric and gaseous components of a reaction mixture obtained by high-pressure polymerization of ethylenically unsaturated monomers in the presence of free-radical polymerization initiators by lowering pressure and temperature has already been described in GB 580182. Apparatuses of different design and geometry have been disclosed as low pressure separating vessels operating in a pressure range of from 0.12 MPa to 0.6 MPa. DE 1219378 describes low pressure separators, in which polyethylene is homogenized by intensive stirring. DD 1219378 refers to a two-stage product separation process, in which an low pressure separator is employed into which the polymer melt is introduced at a point which is at 60% to 100% of the total height of the low pressure separator, through a pipe which is directed downwards at an angle of 50° to 70° to the horizontal close to the wall of the vessel. Preferably the melt inlet is at 60% to 80% of the total height of the low pressure separator. WO 2011/078856 A1 discloses a low pressure separation vessel which includes a cylindrical section that ends in a frustroconical section at its bottom and which has a product inlet mounted on its side for receiving the polymer product from the high pressure separator.

Processes for separating polymeric and gaseous components of a composition obtained by high-pressure polymerization of ethylenically unsaturated monomers allow for the recycling of ethylene, comonomers and other low-molecular weight components from the reaction mixture to the suction side of the secondary compressor. However, there are still a considerable amount of polymeric components carried over by the gas stream leaving the second separating vessel. These components have to be separated from the gas in subsequent separation steps in the ethylene recycle line. Furthermore, entrained polymeric components can adhere to the surface of the separation vessel or to the surface of transfer conduits and cause fouling.

Accordingly there is a need in the art to overcome the disadvantages of the prior art and to provide separation processes which show a very low amount of polymer carry over with the gas stream leaving the second separation vessel. Furthermore, there is a need in the art for processes that allow longer periods of production without the necessity of cleaning the separation vessel and a fast grade change between the different types of produced, low density polyethylenes with a reduced amount of out-of-specification polymer. In addition, since the separating vessels in high-pressure processes for preparing olefin polymers in the presence of free-radical polymerization initiators are large, pressure-resistant apparatuses, there is a constant desire for economic reasons to be able to construct such separation vessels as small as possible without losing a good separating efficiency.

SUMMARY OF THE INVENTION

The present disclosure provides a process for separating a polymer-monomer mixture comprising polymeric components and gaseous components into a liquid fraction and a gaseous fraction, the process comprising the steps of:
(i) introducing the polymer-monomer mixture into a separation vessel;
(ii) separating the polymer-monomer mixture at a pressure of from 0.12 MPa to 0.6 MPa and a temperature of from 120° C. to 300° C. into a gaseous fraction and a liquid fraction;
(iii) withdrawing the gaseous fraction from the top of the separation vessel; and
(iv) withdrawing the liquid fraction from the bottom of the separation vessel,
wherein the polymeric components of the mixture are obtained by high-pressure polymerization of ethylenically unsaturated monomers in the presence of at least one free-radical polymerization initiator,
and wherein
a) the separation vessel has a vertically arranged cylindrical shape with a ratio of length to diameter L/D of from 0.6 to 10;
b) the separation vessel is equipped with an inlet pipe capable of introducing the polymer-monomer mixture into the separation vessel;
c) the inlet pipe extends vertically from the top of the separation vessel into the separation vessel; and
d) the ratio of the inner diameter of the inlet pipe at its lower end and the inner diameter of the separating vessel in its cylindrical part is in the range of from 0.15 to 0.4.

In some embodiments, the inlet pipe is centrally arranged in the separation vessel.

In some embodiments, the polymer-monomer mixture has been obtained as liquid fraction separating a reaction mixture obtained by high-pressure polymerization and the separation was carried out at a pressure of from 15 MPa to 50 MPa and a temperature of from 120° C. to 300° C.

In some embodiments, the inlet pipe extends for a distance into the separation vessel which is from 25% to 40% of the length of the separation vessel.

In some embodiments, wherein the velocity of the polymer-monomer mixture at the lower end of the inlet pipe is in the range of from 0.3 m/s to 20 m/s.

In some embodiments, the vertical velocity of the rising gas in the region from the lower end of the inlet pipe to the outlet for withdrawing the gaseous fraction from the separation vessel is in the range of from 0.02 m/s to 2.0 m/s.

In some embodiments, the surfaces within the separation vessel which are in contact with the liquid fraction have an average roughness Ra of at the most 3.2 μm.

In some embodiments, the surfaces within the separation vessel which are in contact with the liquid fraction are provided with a polytetrafluoroethylene coating.

In some embodiments, the angle of the conical part of the separator is in the range of from 30 to 60°.

In some embodiments, inlet pipe has a conical part which has an angle in the range of from 5 to 25°.

In some embodiments, the level of the liquid fraction in the separation vessel is measured by radiometric level measurement and is controlled by a product discharge valve.

In some embodiments, the conduit providing the polymer-monomer mixture to the separation vessel has a bend in the range of from 60° to 120°.

In some embodiments, the separation vessel is mounted to a pelletizing device.

In some embodiments, the present disclosure provides a process for preparing ethylene homopolymers or copolymers comprising polymerizing ethylenically unsaturated monomers in the presence of free-radical polymerization initiators at temperatures from 100° C. to 350° C. and pressures in the range of from 110 MPa to 500 MPa in a polymerization reactor, the process comprising a process for separating polymeric and gaseous components as described above.

In some embodiments, the polymerization is carried out in one or more tubular reactors or autoclave reactors or combinations of such reactors

DETAILED DESCRIPTION OF THE INVENTION

Figure 1:
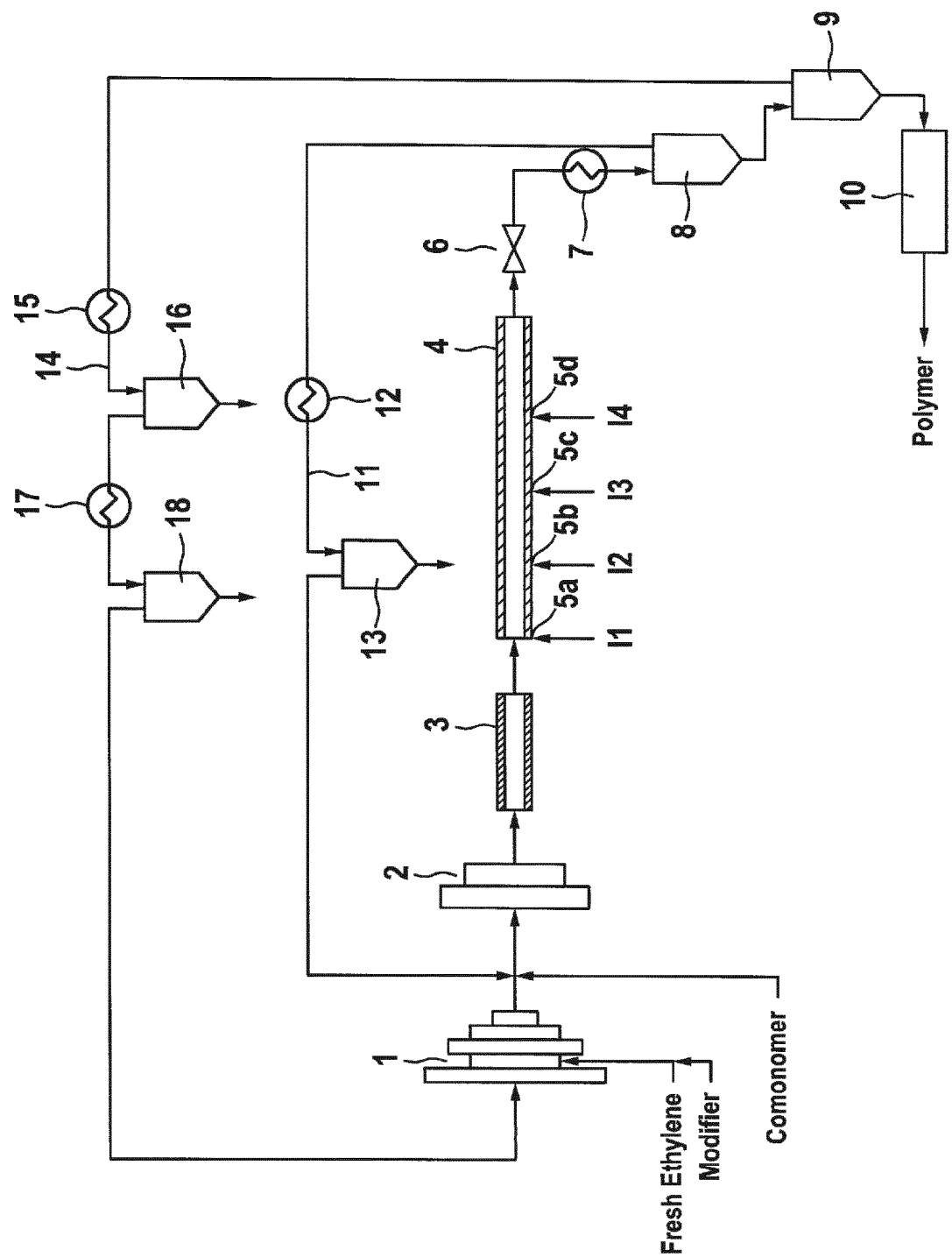
FIG. 1 shows schematically a set-up for a suitable tubular polymerization reactor, without restricting the disclosure to the embodiments described therein.

The process of the present disclosure refers to separating a polymer-monomer mixture comprising polymeric components and gaseous components into a liquid fraction and a gaseous fraction, where the polymeric components of the mixture are obtained by high-pressure polymerization of ethylenically unsaturated monomers in the presence of at least one free-radical polymerization initiator. In an embodiment, the process of the present disclosure refers to separating a polymer-monomer mixture which was obtained as liquid fraction in the first separation vessel after a high-pressure polymerization.

In some embodiments, the high-pressure polymerization is a homopolymerization of ethylene or a copolymerization of ethylene with one or more other monomers, provided that these monomers are free-radically copolymerizable with ethylene under high pressure. Examples of suitable copolymerizable monomers are α,β-unsaturated $C_3$-$C_8$-carboxylic acids, including maleic acid, fumaric acid, itaconic acid, acrylic acid, methacrylic acid and crotonic acid, derivatives of α,β-unsaturated $C_3$-$C_8$-carboxylic acids, e.g. unsaturated $C_3$-$C_{15}$-carboxylic esters, including esters of $C_1$-$C_6$-alkanols, or anhydrides such as methyl methacrylate, ethyl methacrylate, n-butyl methacrylate, tert-butyl methacrylate, methyl acrylate, ethyl acrylate, n-butyl acrylate, 2-ethylhexyl acrylate, tert-butyl acrylate, methacrylic anhydride, maleic anhydride or itaconic anhydride, and 1-olefins such as propene, 1-butene, 1-pentene, 1-hexene, 1-octene or 1-decene. In addition, vinyl carboxylates such as vinyl acetate can be used as comonomers. In some embodiments, propene, 1-butene, 1-hexene, acrylic acid, n-butyl acrylate, tert-butyl acrylate, 2-ethylhexyl acrylate, vinyl acetate or vinyl propionate may be used as a comonomer.

In the case of copolymerization, the proportion of comonomer or comonomers in the reaction mixture is from 1 to 50% by weight, such as from 3 to 40% by weight, based on the amount of monomers, i.e. the sum of ethylene and other monomers. Depending on the type of comonomer, the comonomers may be fed at more than one point to the reactor set-up. In some embodiments, the comonomers are fed to the suction side of the secondary compressor.

For the purposes of the present disclosure, polymers or polymeric materials are all substances which are made up of at least two monomer units, including low density polyethylenes having an average molecular weight $M_n$ of more than 20 000 g/mole. The term "low density polyethylene" is meant to include ethylene homopolymers and ethylene copolymers. The process of the present disclosure may also be employed in the preparation of oligomers, waxes and polymers having a molecular weight $M_n$ of less than 20 000 g/mole.

Possible initiators for starting the free-radical polymerization in the respective reaction zones are in general all substances that can produce radical species under the conditions in the polymerization reactor, for example, oxygen, air, azo compounds and peroxidic polymerization initiators. In one embodiment, the polymerization is carried out using oxygen, either fed in the form of pure $O_2$ or as air. In case of initiating the polymerization with oxygen, the initiator is normally first mixed with the ethylene feed and then fed to the reactor. In such a case it is not only possible to feed a stream comprising monomer and oxygen to the beginning of the polymerization reactor but also to one or more points along the reactor creating two or more reaction zones. Initiation using organic peroxides or azo compounds also represents an embodiment of the present disclosure. Examples of suitable organic peroxides are peroxy esters, peroxy ketals, peroxy ketones and peroxycarbonates, e.g. di(2-ethylhexyl) peroxydicarbonate, dicyclohexyl peroxydicarbonate, diacetyl peroxydicarbonate, tert-butyl peroxyisopropylcarbonate, di-sec-butyl peroxydicarbonate, di-tert-butyl peroxide, di-tert-amyl peroxide, dicumyl peroxide, 2,5-dimethyl-2,5-di-tert-butylperoxyhexane, tert-butyl cumyl peroxide, 2,5-dimethyl-2,5-di(tert-butylperoxy)hex-3-yne, 1,3-diisopropyl monohydroperoxide or tert-butyl hydroperoxide, didecanoyl peroxide, 2,5-dimethyl-2,5-di(2-ethylhexanoylperoxy)hexane, tert-amyl peroxy-2-ethylhexanoate, dibenzoyl peroxide, tert-butyl peroxy-2-ethylhexanoate, tert-butyl peroxydiethylacetate, tert-butyl peroxydiethylisobutyrate, tert-butyl peroxy-3,5,5-trimethylhexanoate, 1,1-di(tert-butylperoxy)-3,3,5-trimethylcyclohexane, 1,1-di(tert-butylperoxy)cyclohexane, tert-butyl peroxyacetate, cumyl peroxyneodecanoate, tert-amyl peroxyneodecanoate, tert-amyl peroxypivalate, tert-butyl peroxyneodecanoate, tert-butyl permaleate, tert-butyl peroxypivalate, tert-butyl peroxyisononanoate, diisopropylbenzene hydroperoxide, cumene hydroperoxide, tert-butyl peroxybenzoate, methyl isobutyl ketone hydroperoxide, 3,6,9-triethyl-3,6,9-trimethyl-triperoxocyclononane and 2,2-di(tert-butylperoxy)butane. Azoalkanes (diazenes), azodicarboxylic esters, azodicarboxylic dinitriles such as azobisisobutyronitrile and hydrocarbons which decompose into free radicals and are also referred as C—C initiators, e.g. 1,2-diphenyl-1,2-dimethylethane derivatives and 1,1,2,2-tetramethylethane derivatives, are also suitable. It is possible to use either individual initiators or mixtures of various initiators. A large range of initiators, such as peroxides, are commercially available, for example the products of Akzo Nobel offered under the trade names Trigonox® or Perkadox®.

Suitable peroxidic polymerization initiators include, for example, 1,1-di(tert-butylperoxy)cyclohexane, 2,2-di(tert-butylperoxy)butane, tert-butyl peroxy-3,5,5-trimethylhexanoate, tert-butyl peroxybenzoate, 2,5-dimethyl-2,5-di(tert-butylperoxy)hexane, tert-butyl cumyl peroxide, di-tert-butyl peroxide and 2,5-dimethyl-2,5-di(tert-butylperoxy)hex-3-yne. In an embodiment, the peroxidic polymerization initiators are tert-butyl peroxy-3,5,5-trimethylhexanoate, di-(2-ethylhexyl)peroxydicarbonate or tert-butyl peroxy-2-ethylhexanoate.

The initiators can be employed individually or as a mixture in concentrations of from 0.1 mol/t to 50 mol/t of polyethylene produced, including from 0.2 mol/t to 20 mol/t, in each reaction zone. In one embodiment, the free-radical polymerization initiator, which is fed to a reaction zone, is a mixture of at least two different azo compounds or organic peroxides. If such initiator mixtures are used, the initiator mixtures may be fed to all reaction zones. There is no limit for the number of different initiators in such a mixture, however in some embodiments the mixtures are composed of from two to six, including two, three or four different initiators. In certain embodiments, mixtures of initiators which have different decomposition temperatures are used.

In some embodiments, the initiators are used in a dissolved state. Examples of suitable solvents are ketones and aliphatic hydrocarbons, including octane, decane and isododecane, and other saturated $C_8$-$C_{25}$-hydrocarbons. The solutions may comprise the initiators or initiator mixtures in proportions of from 2 to 65% by weight, such as from 5 to 40% by weight and from 8 to 30% by weight.

In the high-pressure polymerization process of the present disclosure, the molecular weight of the polymers to be prepared can be altered by the addition of modifiers, which act as chain-transfers agents. Examples of suitable modifiers are hydrogen, aliphatic and olefinic hydrocarbons, e.g. propane, butane, pentane, hexane, cyclohexane, propene, 1-butene, 1-pentene, and 1-hexene, ketones such as acetone, methyl ethyl ketone (2-butanone), methyl isobutyl ketone, methyl isoamyl ketone, diethyl ketone and diamyl ketone, aldehydes such as formaldehyde, acetaldehyde and propionaldehyde, and saturated aliphatic alcohols such as methanol, ethanol, propanol, isopropanol and butanol. In certain embodiments, saturated aliphatic aldehydes such as propionaldehyde or 1-olefins such as propene, 1-butene and 1-hexene, or aliphatic hydrocarbons such as propane may be used.

In some embodiments, the high-pressure polymerization is carried out at pressures of from 110 MPa to 500 MPa, including from 160 MPa to 350 MPa and from 200 MPa to 330 MPa for polymerization in a tubular reactor, and pressures of from 110 MPa to 300 MPa and from 120 MPa to 280 MPa for polymerization in an autoclave reactor. In certain embodiments, the polymerization temperatures are in a range of from 100° C. to 350° C., from 180° C. to 340° C. and from 200° C. to 330° C. for polymerization in a tubular reactor, and in a range of from 110° C. to 320° C. and from 120° C. to 310° C. for polymerization in an autoclave reactor.

The polymerization can be carried out with all types of high-pressure reactors appropriate for high-pressure polymerization. Suitable high-pressure reactors are, for example, tubular reactors or autoclave reactors or combinations of such reactors. In some embodiments, the high-pressure reactors are tubular reactors or autoclave reactors.

In certain embodiments, high-pressure autoclave reactors for use in the present technology include stirred reactors having a length-to-diameter ratio of in the range from 2 to 30, such as from 2 to 20. Such autoclave reactors may have one or more reaction zones, including from 1 to 6 reaction zones and from 1 to 4 reaction zones. The number of reaction zones depends from the number of agitator baffles, which separate individual mixed zones within the autoclave reactor.

Appropriate tubular reactors for use in the present technology are long, thick-walled pipes, which in some embodiments are about 0.5 km to 4 km, including from 1 km to 3 km and from 1.5 km to 2.5 km, in length. In some embodiments, the inner diameter of the pipes is usually in the range of from about 30 mm to 120 mm, including from 60 mm to 100 mm. Such tubular reactors may have a length-to-diameter ratio of greater than 1000, including from 10000 to 40000 and from 25000 to 35000.

In further embodiments, tubular reactors for use in the present disclosure have at least two reaction zones, such as from 2 to 6 reaction zones and from 2 to 5 reaction zones. The number of reaction zones is given by the number of feeding points for the initiator. Such a feeding point can, for example, be an injection point for a solution of azo compounds or organic peroxides. Fresh initiator may be added to the reactor, where it decomposes into free radicals and initiates further polymerization. The heat generated by the reaction increases the temperature of the reaction mixture, as more heat is generated than can be removed through the walls of the tubular reactor. The rising temperature increases the rate of decomposition of the free-radical initiators and accelerates polymerization until essentially all of the free-radical initiator is consumed. No further heat is generated and the temperature decreases again since the temperature of the reactor walls is lower than the temperature of the reaction mixture. Accordingly, in some embodiments the part of the tubular reactor downstream of an initiator feeding point in which the temperature rises is the reaction zone, while the part thereafter, in which the temperature decreases again, is predominantly a cooling zone. The amount and nature of added free-radical initiators determines how much the temperature rises and accordingly allows for adjusting that value. In certain embodiments, the temperature rise is in a range of from 70° C. to 170° C. in the first reaction zone and 50° C. to 130° C. for the subsequent reaction zones, depending on the product specifications and the reactor configuration.

The compression of the reaction gas composition to the polymerization pressure may be carried out, in some embodiments, by at least two sequentially operating compressors, of which a primary compressor first compresses the reaction gas composition to a pressure of from 10 MPa to 50 MPa and a secondary compressor, which is sometimes designated as hyper compressor, further compresses the reaction gas composition to the polymerization pressure of from 110 MPa to 500 MPa. In certain embodiments, the primary compressor and the secondary compressor are multistage compressors. It is further possible to separate one or more stages of one or both of these compressors and divide the stages into separated compressors. However, in further embodiments a series of one primary compressor and one secondary compressor is used for compressing the reaction gas composition to the polymerization pressure. In such cases, sometimes the whole primary compressor is designated as the primary compressor. However, it is also common to designate the one or more first stages of the primary compressor, which compress the recycle gas from the low-pressure product separator to the pressure of the fresh ethylene feed, as the booster compressor, and then only refer to the one or more subsequent stages as the primary compressor, although all stages may be part of one apparatus.

In some embodiments, the polymerization apparatus comprises, beside the polymerization reactor, a high-pressure gas recycle line and a low-pressure gas recycle line for recycling unreacted monomers to the polymerization process. The reaction mixture obtained in the polymerization reactor may be transferred to a first separation vessel, frequently called a high-pressure product separator, and separated into a gaseous fraction and a liquid fraction at a pressure of from 15 MPa to 50 MPa. The gaseous fraction withdrawn from the first separation vessel is fed via the high-pressure gas recycle line to the suction side of the secondary compressor. In the high-pressure gas recycle line, the gas may be purified by several purifications steps from undesired components such as entrained polymer or oligomers. The liquid fraction withdrawn from the first separation vessel, which in certain embodiments still comprises dissolved monomers such as ethylene and comonomers in an amount of 20-40% of weight, is transferred to a second separation vessel, frequently called low-pressure product separator, and further separated, at reduced pressure, e.g. at an absolute pressure in the range of from 0.1 to 0.5 MPa, in polymeric and gaseous components. The gaseous fraction withdrawn from the second separation vessel may be fed via the low-pressure gas recycle line to the primary compressor, such as to the foremost of the stages. In some embodiments, the low-pressure gas recycle line comprises several purifications steps for purifying the gas from undesired components.

In certain embodiments, the recycled gas coming from the low-pressure gas recycle line is compressed by the first stages of the primary compressor to the pressure of the fresh feed of ethylenically unsaturated monomers, such as ethylene, and thereafter combined with the fresh gas feed and the combined gases to be compressed in the primary compressor to the pressure of from 10 MPa to 50 MPa. In additional embodiments, the primary compressor comprises five or six compression stages, two or three before adding the fresh gas and two or three after adding the fresh gas. In some embodiments, the secondary compressor may have two stages; a first stage, which compresses the gas from about 30 MPa to about 120 MPa, and a second stage, which further compresses the gas from about 120 MPa to the final polymerization pressure.

Different configurations for suitable polymerization apparatuses such as, for example, autoclave reactors are possible.

FIG. 1 shows schematically a typical set-up for a suitable tubular polymerization reactor, without restricting the disclosure to the embodiments described therein.

As shown in FIG. 1, the fresh ethylene, which may be under a pressure of 1.7 MPa, is compressed to a pressure of about 30 MPa by means of a primary compressor (1) and then compressed to the reaction pressure of about 300 MPa using a secondary compressor (2). The molecular weight regulator is added to primary compressor (1). The reaction mixture leaving the primary compressor (2) is fed to preheater (3), where the reaction mixture is preheated to the reaction start temperature of from about 120° C. to 220° C., and then conveyed to the tubular reactor (4).

The tubular reactor (4) is basically a long, thick-walled pipe with cooling jackets to remove the liberated heat of reaction from the reaction mixture by means of a coolant circuit (not shown). In some embodiments, the pipe is from about 0.5 km to 4 km, including from 1.5 km to 3 km and from 2 km to 2.5 km long. In further embodiments, the inner diameter of the pipe is in the range of from about 30 mm to 120 mm, including from 60 mm to 100 mm.

The tubular reactor (4) shown in FIG. 1 has four spatially separated initiator injection points (5a), (5b), (5c) and (5d) for feeding initiators or initiator mixtures I1, I2, I3 and I4 to the reactor and four reaction zones. By feeding suitable free-radical initiators, which decompose at the temperature of the reaction mixture, to the tubular reactor the polymerization reaction starts. The generated heat of the reaction increases the temperature of the reaction mixture, since more heat is generated than can be removed through the walls of the tubular reactor. The rising temperature increases the rate of decomposition of the free-radical initiators and accelerates polymerization until all free-radical initiators are consumed. Thereafter, no further heat is generated and the temperature decreases again since the temperature of the reactor walls is lower than the temperature of the reaction mixture. Accordingly, the part of the tubular reactor downstream of an initiator injection point, in which the temperature rises, is a reaction zone, while the part thereafter, in which the temperature decreases again, is predominantly a cooling zone.

The amount and nature of added free-radical initiators determines how much the temperature rises and accordingly allows for adjusting the temperature. In certain embodiments, the temperature rise in the first reaction zone is set to be in the range of from 70° C. to 170° C., and 50° C. to 130° C. for the subsequent reaction zones, depending on the product specifications and reactor configuration. The reaction mixture leaves the tubular reactor (4) through a high-pressure let-down valve (6) and passes a post-reactor cooler (7). Thereafter, the resulting polymer is separated off from any unreacted ethylene and other low molecular weight compounds (monomers, oligomers, polymers, additives, solvent, etc.) by means of a first separation vessel (8) and a second separation vessel (9), discharged and pelletized via an extruder and granulator (10).

The ethylene and comonomers which have been separated off in the first separation vessel (8) are fed back to the inlet end of the tube reactor (4) in the high-pressure circuit (11) at 30 MPa. They are first freed from other constituents in at least one purification stage and then added to the monomer stream between primary compressor (1) and secondary compressor (2). FIG. 1 shows one purification stage consisting of a heat exchanger (12) and a separator (13). It is however also possible to use a plurality of purification stages in certain embodiments. The high-pressure circuit (11) may be used to separate waxes.

The ethylene which has been separated off in the second separation vessel (9), which further comprises, inter alia, the major part of the low molecular weight products of the polymerization (oligomers) and the solvent, is worked up in the low-pressure circuit (14), at an absolute pressure of from about 0.1 to 0.5 MPa, in a plurality of separators with a heat exchanger being located between each of the separators. FIG. 1 shows two purification stages consisting of heat exchangers (15) and (17) and separators (16) and (18). It is however also possible to use only one purification stage or more than two purification stages. The low-pressure circuit (14) may be used to separate oils and waxes.

Different configurations for suitable tubular polymerization reactor are also possible. In some embodiments, the monomers are not only added at the inlet of the reactor tube but also fed, possibly cooled, at a plurality of different points to the reactor. This feeding may be done, in certain embodiments, at the beginning of any further reaction zones and especially if oxygen or air is used as an initiator, which is usually added to the monomer feed in the primary compressor.

According to some embodiments, the present disclosure relates to separating polymeric and gaseous components of a polymer-monomer mixture where the polymeric components are obtained by high-pressure polymerization of ethylenically unsaturated monomers in the presence of free-radical polymerization initiators. The polymer-monomer mixture is preferably the liquid fraction withdrawn from the first separation vessel which usually operates at a pressure of from 15 MPa to 50 MPa and a temperature of from 120° C. to 300° C. The separation process of the present disclosure comprises the steps of introducing the polymer-monomer mixture into a separation vessel; separating the polymer-monomer mixture into a gaseous fraction and a liquid fraction; withdrawing the gaseous fraction from the top of the separation vessel; and withdrawing the liquid fraction from the bottom of the separation vessel. The separation is carried out at a pressure of from 0.12 MPa to 0.6 MPa, such as from 0.15 MPa to 0.2 MPa, and a temperature of from 120° C. to 300° C., including from 220° C. to 290° C. for ethylene homopolymers and from 130° C. to 260° C. for ethylene copolymer. At the conditions of operating the separation vessel, the polymeric components within the separating vessel are in a liquid state.

In certain embodiments, the separation vessel has a cylindrical shape with a ratio of length to diameter L/D of from 0.6 to 10, such as from 2 to 8, and is vertically arranged. The values for the vessel length and the vessel diameter refer to the inner dimensions. In some embodiments, the lower end of the separation vessel is formed as a cone, where the height of the cone is included in the vessel length. Preferably the total cone angle, i.e. the aperture of the cone, is in the range of from 30° to 60°, more preferably in the range of from 40° to 50° and especially in the range of from 43° to 47°. The separation vessel is equipped with an inlet pipe for introducing the polymer-monomer mixture into the separation vessel, where the inlet pipe extends vertically from the top into the separation vessel, and the inlet pipe is centrally arranged in the separation vessel. The process for separating the polymeric and gaseous components is further characterized in that the ratio of the inner diameter of the inlet pipe at its lower end, i.e. at the outlet of the pipe, and the inner diameter of the separating vessel in its cylindrical part is in the range of from 0.15 to 0.4, such as from 0.2 to 0.35. The realization of the required ratio of the inner diameter of the inlet pipe at its lower end to the inner diameter of the separating vessel in its cylindrical part may be achieved in some embodiments by utilizing, as inlet pipe, a tube which widens from top to bottom. The widening part of the inlet pipe may have a conical shape with a total cone angle, i.e. an aperture, in the range of from 5° to 40°, including from 10° to 30° and from 15° to 25°. Below the widening part, the inlet pipe can further have a cylindrical part with the diameter of the inlet pipe at its lower end. The inlet pipe can be remounted, i.e. pulled out of the separation vessel, by disconnecting a special manhole flange on top of the vessel.

According to an embodiment of the present disclosure, the inlet pipe extends for a distance into the separation vessel, which is from 25% to 50% of the length of the separation vessel, including from 30% to 40% of the length of the separation vessel.

In further embodiments, the outlet for withdrawing the gaseous fraction from the separation vessel is located at the top of the separation vessel. Consequently, in some embodiments the distance from the lower end of the inlet pipe to the outlet for withdrawing the gaseous fraction from the separation vessel is from 25% to 50% of the length of the separation vessel, such as from 30% to 40% of the length of the separation vessel.

The velocity of the polymer-monomer mixture at the lower end of the inlet pipe is, in some embodiments, in the range of from 0.3 m/s to 20 m/s, such as from 0.5 m/s to 10 m/s and from 1 m/s to 5 m/s. The velocity of the polymer-monomer mixture at the lower end of the inlet pipe can be determined from the mass-flow through the inlet pipe, the overall density of the combination of gaseous and liquid components of the polymer-monomer mixture under the conditions, i.e. pressure and temperature, within the separation vessel and the opening area of the inlet pipe at its lower end. The conduit providing the polymer-monomer mixture to the separation vessel, which may be the pipe for conveying the polymer-monomer mixture from a first separation vessel to a second separation vessel of a high-pressure polymerization setup, may have a bend in the range of from 60° to 120°, including from 80° to 100° and about 90° C.

In some embodiments, the vertical velocity of the rising gas in the region from the lower end of the inlet pipe to the outlet for withdrawing the gaseous fraction from the separation vessel, which outlet is arranged above the lower end of the inlet pipe, e.g. at the top of the vessel, is in the range of from 0.02 m/s to 2 m/s, from 0.04 m/s to 1 m/s and from 0.05 m/s to 0.5 m/s.

In some embodiments, the gaseous fraction of the polymer-monomer mixture withdrawn from the top of the separating vessel may be fed to the low pressure recycle and, after purification and cooling, returned to the suction side of the primary compressor. For purifying, the gas exiting the separation vessel may first be fed to a heat exchanger in which the gas is cooled by hot water, and thereafter to a further separator, in which most of the carried over polymeric and oligomeric materials and impurities are separated from the gas. By passing additional cooling and separating steps, the gas may be further purified.

The liquid fraction of the polymer-monomer mixture withdrawn from the bottom of the separating vessel is, in some embodiments, transferred to a device for pelletizing the polymer, such as an extruder or a continuous mixers, in which the material is usually further mixed, optionally degassed and then transferred into small solid particles, usually by passing the melt through a die and chopping the strand into short segments. Preferably the separation vessel is directly mounted to the pelletizing device.

The level of the liquid phases in the separating vessel may be measured by radiometric level measurement. The filling level may be controlled by a product discharge valve such as a gate valve, a slide valve, a melt diverter valve or a piston valve or by a gate valve. In an alternative embodiment, the valve is customarily fully opened and the filling level is controlled via the rotational speed of the pelletizing device such as the extruder.

Figure 2:
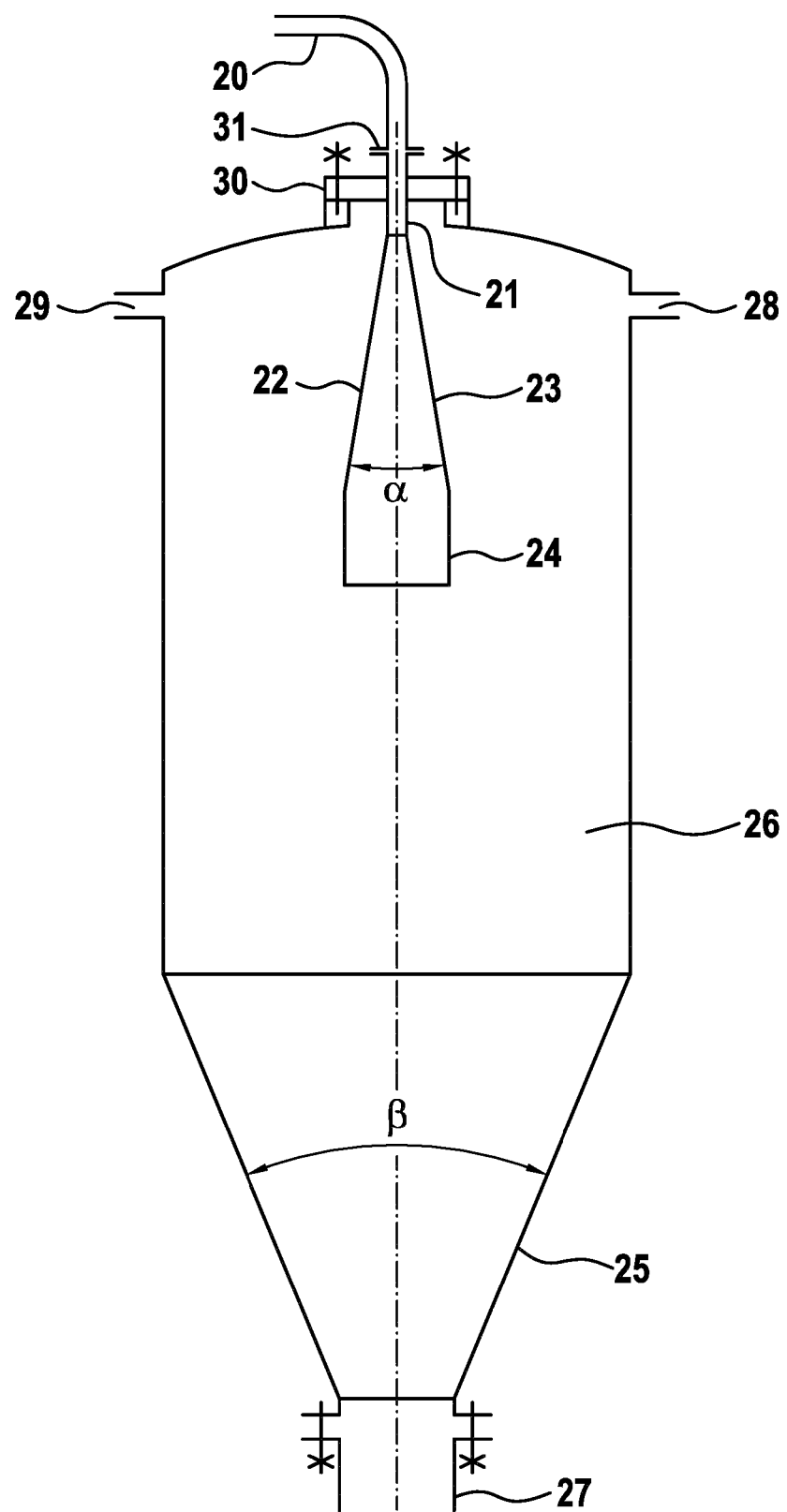
FIG. 2 shows schematically a cross-section of a separation vessel suitable for the separating process of the present disclosure.

FIG. 2 shows schematically a cross-section of a separation vessel suitable for the separating process of the present disclosure.

The liquid material withdrawn from separation vessel (8) (not shown in FIG. 2) is transferred to separation vessel (9) via a conduit (20), which has a 90° bend above the separation vessel (9). The liquid material then enters separation vessel (9) from the top through a piping (21) which transforms in an inlet pipe (22). Inlet pipe (22) widens from top to bottom by a conical part (23) having a total cone angle α of 20° followed by a cylindrical part (24) of an inner diameter which is the inner diameter at the lower end of the inlet pipe.

At the bottom, separation vessel (9) tapers by a conical part (25) having a total cone angle β of 45°. The internal space of the separation vessel (26) is partly filled with a liquid fraction which is primarily molten polymer. The liquid fraction exits the separation vessel at the bottom through piping (27). The gaseous fraction leaves the separation vessel at the top. FIG. 2 shows two outlets (28) and (29) for the gaseous fraction, it is however also possible to design the separation vessel (9) with one or three, or four or more outlets for the gaseous fraction.

At the top, the separation vessel is closed by a removable cover (30), to which the inlet pipe is removably connected via flange (31).

In some embodiments, the cylindrical part of the separation vessel is efficiently heated by means of coils or a jacket or heating panels, through which high- or medium-pressure saturated steam or pressurized water at a temperature of from 120 to 300° C. is passed, and the cone is more intensively heated by means of coils or a jacket or heating panels, through which high- or medium-pressure saturated steam or pressurized water at temperature of from 120 to 300° C. is passed.

In one embodiment of the present disclosure, the surfaces within the separation vessel, which are in contact with the liquid fraction, have an average roughness Ra of from 0.05 µm to 5 µm, such as from 0.5 µm to 3.2 µm and from 0.1 µm to 1 µm. The low roughness may be achieved by grinding or polishing of the surface, or by electro-polishing of the surface. In an alternative embodiment, the surfaces within the separation vessel which are in contact with the liquid fraction are provided with a polytetrafluoroethylene coating. The polytetrafluoroethylene coating may be provided to the conical part of the separation vessel, the cyclindical part of the separation vessel and to the outer surface of the inlet pipe. As a consequence of the resulting low adhesion of the liquid fraction to the surfaces, the separation vessel shows no fouling. This step results in an improved polymer quality with respect to gels and long operation periods of the separation vessel, in which no inner cleaning may be required for several years.

Typical volumes for separation vessels for the separating process according to the present disclosure are, depending on plant capacity and dedicated products, in a range from 4 m³ to 100 m³ m for high-pressure polymerization plants with an annual capacity of 80,000 to 500,000 tons of LDPE.

In one embodiment of the present disclosure, the filling level of the liquid fraction in the separation vessel is measured by radiometric level measurements and is controlled by a product discharge valve which operates based on data coming from the level measurement. The filling level may be kept in a range from a pre-defined minimum filling level to a pre-defined maximum level. In some embodiments, the distance from the maximum filling level to the lower end of the inlet pipe is from 20% to 40% of the length of the separation vessel, including from 25% to 35% of the length of the separation vessel.

The level of the liquid fraction in the separation vessel may be maintained as low as reasonably practical to minimize the probability that polymeric material polymer is carried over from the separation vessel to the high-pressure recycle gas system, and to minimize the residence time of the polymer in the separation vessel in order to reduce the risk of gel formation. Accordingly, the separation vessel is preferably operated with a filling level which corresponds to an amount of polymer contained in the separation vessel which can be produced, running the high-pressure reactor with standard throughput, within 5 min. It is further preferred that the maximum filling level corresponds to an amount of polymer contained in the separation vessel which can be produced, running the high-pressure reactor with standard throughput, within 20 min.

The separating process according to the present disclosure brings about high separation efficiency. The carry-over of polymeric material with the gaseous fraction to the high-pressure recycle gas system is very low. The carry-over in a high-pressure polymerization plant with an annual capacity of 300,000 tons LDPE may be 30 kg to 60 kg of polymeric material in 24 hours. The process also results in low fouling of the walls of the separation vessel. The separation process according to the present disclosure gives a relatively plain surface level of the liquid fraction within the separation vessel, which facilitates an accurate measurement of the filling level. This plain surface level further allows for emptying of the separation vessel to a high extent by lowering the filling level as necessary, for example in the context of a grade change.

The process for separating polymeric and gaseous components of a polymer-monomer mixture according to the present disclosure may be utilized as part of a process for preparing ethylene homopolymers or copolymers.

Accordingly, the present disclosure also refers to a process for preparing ethylene homopolymers or copolymers from ethylenically unsaturated monomers in the presence of free-radical polymerization initiators at temperatures from 100° C. to 350° C. and pressures in the range of from 110 MPa to 500 MPa in a polymerization reactor comprising such a process for separating polymeric and gaseous component. The polymerization may be carried out in one or more tubular reactors or autoclave reactors or combinations of such reactors.

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

What is claimed is:

1. A process for separating a polymer-monomer mixture comprising polymeric components and gaseous components into a liquid fraction and a gaseous fraction comprising the steps of:
   (i) introducing the polymer-monomer mixture into a separation vessel;
   (ii) separating the polymer-monomer mixture at a pressure of from 0.12 MPa to 0.6 MPa and a temperature of from 120° C. to 300° C. into a gaseous fraction and a liquid fraction;
   (iii) withdrawing the gaseous fraction from the top of the separation vessel; and
   (iv) withdrawing the liquid fraction from the bottom of the separation vessel,
   wherein the polymeric components of the mixture are produced by high-pressure polymerization of ethylenically unsaturated monomers in the presence of at least one free-radical polymerization initiator,
   and wherein
   a) the separation vessel has a vertically arranged cylindrical shape with a ratio of length to diameter L/D of from 0.6 to 10;
   b) the separation vessel is equipped with an inlet pipe capable of introducing the polymer-monomer mixture into the separation vessel;
   c) the inlet pipe extends vertically from the top of the separation vessel into the separation vessel; and
   d) the ratio of the inner diameter of the inlet pipe at its lower end and the inner diameter of the separating vessel in its cylindrical part is in the range of from 0.15 to 0.4.

2. The process according to claim 1, wherein the inlet pipe is centrally arranged in the separation vessel.

3. The process according to claim 1, wherein the polymer-monomer mixture is produced as a liquid fraction by separating a reaction mixture produced by high-pressure polymerization and the separation was carried out at a pressure of from 15 MPa to 50 MPa and a temperature of from 120° C. to 300° C.

4. The process according to claim 1, wherein the inlet pipe extends for a distance into the separation vessel which is from 25% to 40% of the length of the separation vessel.

5. The process according to claim 1, wherein the velocity of the polymer-monomer mixture at the lower end of the inlet pipe is in the range of from 0.3 m/s to 20 m/s.

6. The process according to claim 1, wherein the vertical velocity of the rising gas in the region from the lower end of the inlet pipe to the outlet for withdrawing the gaseous fraction from the separation vessel is in the range of from 0.02 m/s to 2.0 m/s.

7. The process according to claim 1, wherein the surfaces within the separation vessel which are in contact with the liquid fraction have an average roughness Ra of at the most 3.2 μm.

8. The process according to claim 1, wherein the surfaces within the separation vessel which are in contact with the liquid fraction are provided with a polytetrafluoroethylene coating.

9. The process according to claim 1, wherein the angle of the conical part of the separator is in the range of from 30 to 60°.

10. The process according to claim 1, wherein inlet pipe has a conical part which has an angle in the range of from 5 to 25°.

11. The process according to claim 1, wherein the level of the liquid fraction in the separation vessel is measured by radiometric level measurement and is controlled by a product discharge valve.

12. The process according to claim 1, wherein the conduit providing the polymer-monomer mixture to the separation vessel has a bend in the range of from 60° to 120°.

13. The process according to claim 1, wherein the separation vessel is mounted to a pelletizing device.

14. A process for preparing ethylene homopolymers or copolymers comprising polymerizing ethylenically unsaturated monomers in the presence of free-radical polymerization initiators at temperatures from 100° C. to 350° C. and pressures in the range of from 110 MPa to 500 MPa in a polymerization reactor, the process comprising a process for separating a produced polymer-monomer mixture comprising polymeric components and gaseous components into a liquid fraction and a gaseous fraction, the process comprising the steps of:
   (v) introducing the polymer-monomer mixture into a separation vessel;
   (vi) separating the polymer-monomer mixture at a pressure of from 0.12 MPa to 0.6 MPa and a temperature of from 120° C. to 300° C. into a gaseous fraction and a liquid fraction;
   (vii) withdrawing the gaseous fraction from the top of the separation vessel; and
   (viii) withdrawing the liquid fraction from the bottom of the separation vessel, wherein the polymeric components of the mixture are produced by high-pressure polymerization of ethylenically unsaturated monomers in the presence of at least one free-radical polymerization initiator, and wherein a) the separation vessel has a vertically arranged cylindrical shape with a ratio of length to diameter L/D of from 0.6 to 10;

b) the separation vessel is equipped with an inlet pipe capable of introducing the polymer-monomer mixture into the separation vessel;

c) the inlet pipe extends vertically from the top of the separation vessel into the separation vessel; and d) the ratio of the inner diameter of the inlet pipe at its lower end and the inner diameter of the separating vessel in its cylindrical part is in the range of from 0.15 to 0.4.

15. The process according to claim 14, wherein the polymerization is carried out in one or more tubular reactors or autoclave reactors or combinations of such reactors.

16. The process according to claim 14, wherein the inlet pipe is centrally arranged in the separation vessel.

17. The process according to claim 14, wherein the separation is carried out at a pressure of from 15 MPa to 50 MPa and a temperature of from 120° C. to 300° C.

18. The process according to claim 14, wherein the inlet pipe extends for a distance into the separation vessel which is from 25% to 40% of the length of the separation vessel.

19. The process according to claim 14, wherein the velocity of the polymer-monomer mixture at the lower end of the inlet pipe is in the range of from 0.3 m/s to 20 m/s.

20. The process according to claim 14, wherein the surfaces within the separation vessel which are in contact with the liquid fraction have an average roughness Ra of at the most 3.2 μm.

* * * * *